Figure 3:
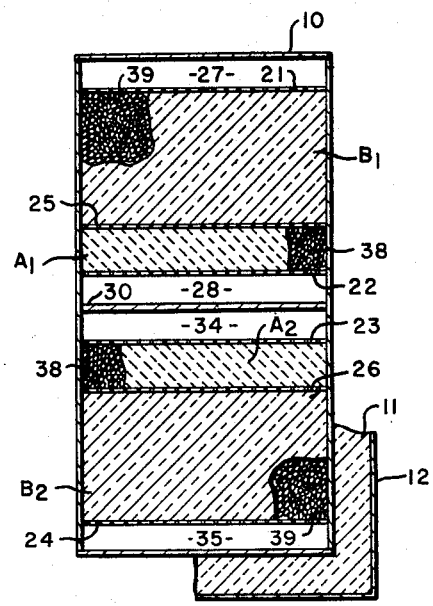

July 26, 1960
E. J. HOUDRY
2,946,651
CATALYTIC TREATMENT OF GAS STREAMS
Filed Aug. 9, 1956
3 Sheets-Sheet 1
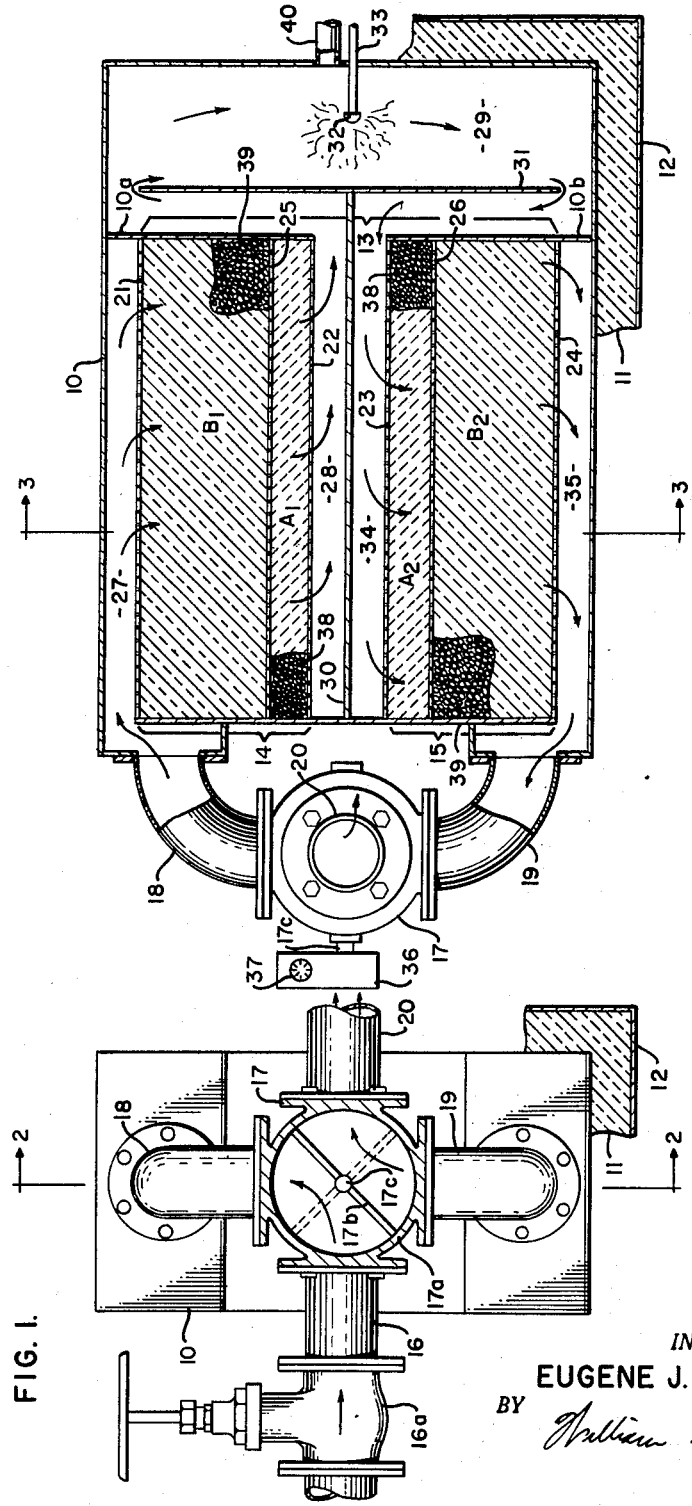
*INVENTOR.*
EUGENE J. HOUDRY
BY
ATTORNEY July 26, 1960     E. J. HOUDRY     2,946,651
CATALYTIC TREATMENT OF GAS STREAMS
Filed Aug. 9, 1956     3 Sheets-Sheet 2

INVENTOR.
EUGENE J. HOUDRY
BY
ATTORNEY

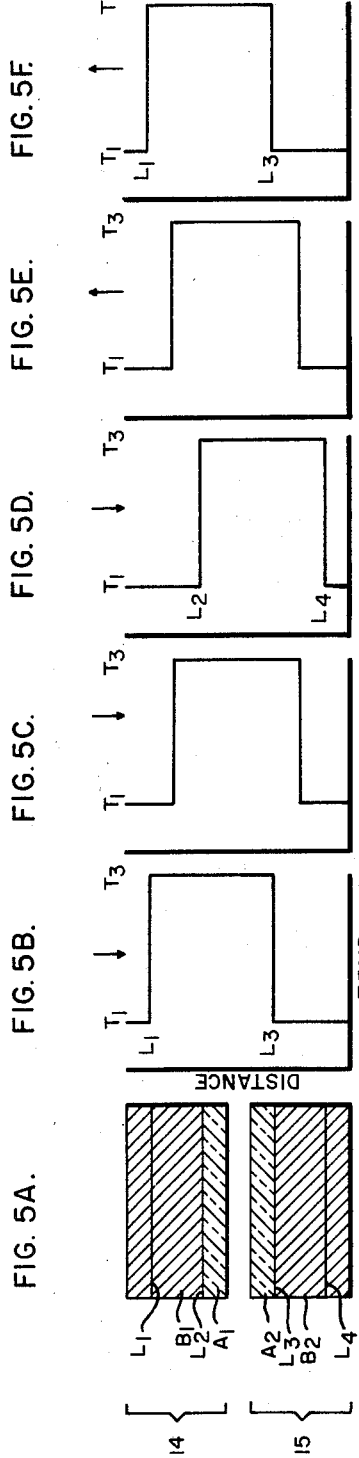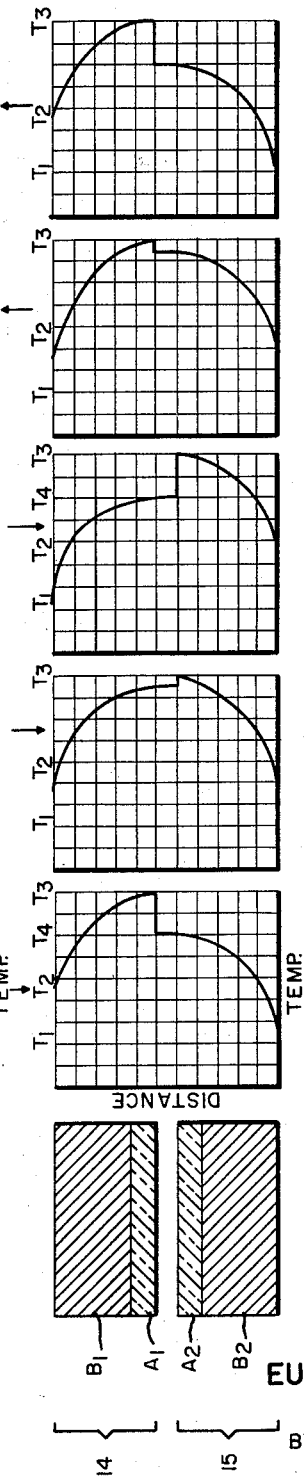

2,946,651
CATALYTIC TREATMENT OF GAS STREAMS

Eugene J. Houdry, Ardmore, Pa., assignor to Oxy-Catalyst, Inc., a corporation of Pennsylvania Filed Aug. 9, 1956, Ser. No. 603,029

4 Claims. (Cl. 23—2)

This invention relates to the catalytic treatment of gas streams containing relatively small amounts of oxidizable impurities.

The problem of purifying gaseous effluents containing oxidizable impurities is one of ever increasing importance as the problem of air pollution in large cities and industrial areas becomes increasingly serious. The effluents from internal combustion engines, including gasoline engines and diesels, the effluents from many chemical manufacturing processes and from other industrial operations, such as from enameling ovens producing solvent-laden fumes, all require purification to eliminate the objectionable material which they contain such as carbon monoxide, hydrocarbons, and oxygenated organics such as aldehydes and organic acids.

The use of oxidation catalysts to catalytically oxidize these impurities presents in many respects an ideal method for the purification of these gaseous effluents. In contrast to the use of flame incineration, purification in the presence of catalysts takes place at considerably lower temperatures which is important both from the standpoint of the materials of construction required in the purifier and the energy requirements for effecting the purification.

Even in the case of catalytic purification however, effective purification depends upon the use of temperatures which are often considerably above the temperature of the effluent to be purified. The temperature of the effluent may be, for example, 400° F. while that required for effective catalytic purification may be 1000° F. In some cases, where the effluent is quite rich in oxidizable material, some or all of the heat required to raise the gas stream to the required temperature may be supplied by oxidation of the impurities themselves. In a great many cases, however, the impurities occur in relatively small concentrations or only in traces so that they supply only a small or negligible amount of heat when oxidized.

Supplying the additional heat required to raise the temperature of the gas stream by auxiliary burners or the like in such a situation may be prohibitively costly. While it is possible to reduce the amount of extraneously supplied heat by the use of conventional heat exchangers, such as a gas-to-gas tubular exchanger, the cost and size of such exchangers is quite high because of the inherent inefficiency of gas-to-gas heat exchange.

It is the object of the present invention to provide a practical and economical method and system for catalytically treating relatively low temperature gas streams containing small or trace amounts of oxidizable material. Other objects of the invention will become apparent from the description and drawings.

According to the invention the catalytic purification of such streams is carried out by flowing the stream through a gas permeable bed of solids which performs the function both of a heat exchanger and of a heat generator. At least the central portion of the bed of solids with respect to the direction of gas flow is comprised of an oxidation catalyst, and this portion of the bed is operated as a heat generator by injecting fuel into the gas stream in such manner that the fuel is catalytically oxidized by contact with the oxidation catalyst as the stream traverses the central portion of the bed, thus maintaining the central portion at a temperature sufficiently high to promote the catalytic oxidation of oxidizable material in the stream. The bed of solids is operated as a heat exchanger by periodically reversing the direction of flow of the gas stream through the bed at such intervals that the hot zone of the bed is maintained generally within the central portion thereof, while the outer portions of the bed with respect to the direction of gas flow are maintained at a relatively low temperature. By operating in this manner, the gas stream enters the bed at a relatively low temperature, is heated in the central portion of the bed to the temperature required for effectively catalytically oxidizing its oxidizable constituents, and after such treatment is cooled by further heat exchange with the bed.

As will appear from the more detailed description which follows, this mode of operation permits an efficient exchange of heat with the use of a relatively small and inexpensive heat exchanger, while at the same time making it possible to eliminate the use of combustion chambers, auxiliary fuel burners and the like. As a result relatively cool gas streams containing small amounts of oxidizable constituents may be economically and efficiently treated in a relatively small, compact system with the use of a minimum amount of extraneously supplied fuel.

Figure 4A:
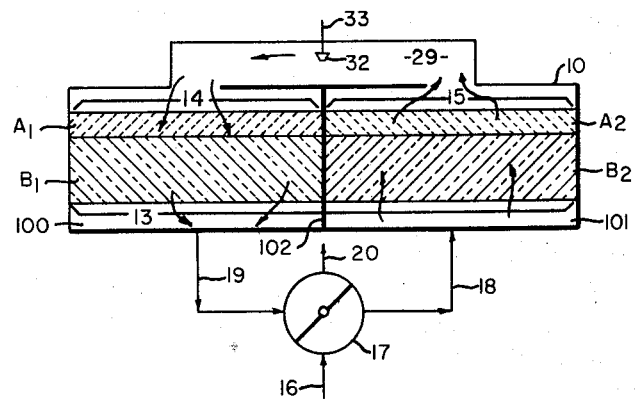
Figure 4B:
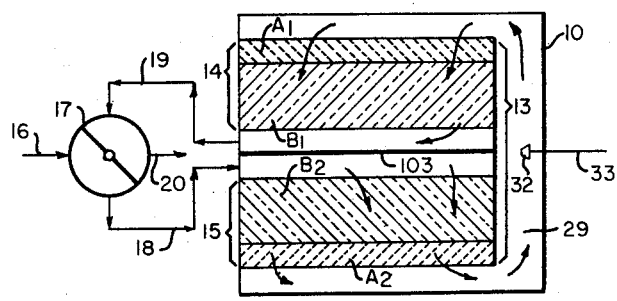

For a better understanding of the invention, reference is now made to the accompanying drawings in which Fig. 1 is an end elevation partly in section of an embodiment of the invention; and, Fig. 2 is a cross-sectional view taken on the line 2—2 of Fig. 1; and, Fig. 3 is a cross-sectional view taken on the line 3—3 of Fig. 2; and, Figs. 4A and 4B are diagrammatic illustrations of alternative arrangements of the embodiment shown in Figs. 1 to 3; and, Figs. 5A to 5F inclusive graphically illustrate the principles of operation of the device constructed in accordance with the invention; and, Figs. 6A to 6F inclusive illustrate in an idealized fashion the actual performance of a device constructed in accordance with the invention.

Referring particularly to Figs. 1 and 2 of the drawings, the reference numeral 10 refers to a housing which may, for example, be constructed of stainless steel or other heat-resistant metal. Housing 10 is provided with insulation 11 held in place by a jacket 12 of a suitable light gage metal.

Within housing 10, a bed of gas permeable solids is provided. The bed is separated into two sections, the entire bed being indicated as embraced by the large bracket 13, while the two sections are indicated as embraced by the smaller brackets 14 and 15. Each section of the bed is made up of relatively small solid particles ranging in size, for example, from $\frac{1}{16}''$ to $\frac{1}{2}''$.

The two sections of the bed 13 are each supported within the housing 10 between perforated plates. Section 14 is supported between an upper perforated plate 21 and a lower perforated plate 22. Section 15 is supported between an upper perforated plate 23 and a lower perforated plate 24. Section 14 is further divided by perforated plate 25 into sub-sections $A_1$ and $B_1$. Section 15 is further divided by perforated plate 26 into sub-sections $A_2$ and $B_2$. In the embodiment shown, sub-sections $A_1$ and $A_2$ contain oxidation catalyst while sub-sections $B_1$ and $B_2$ contain relatively inert solids which are employed principally to perform heat exchange functions.

As may be seen from Figs. 2 and 3, perforated plates 21 to 26 inclusive extend along and across the housing 10 and are welded or otherwise attached to the walls of the housing 10 along three sides and to interior partitions 10a and 10b along their fourth side. Partitions 10a and 10b are themselves welded or otherwise suitably attached to the walls of the housing.

The gas stream to be treated is introduced into the housing 10 through line 16, 4-way valve 17, and conduits 18 and 19. The treated gas leaves the apparatus by outlet line 20. As may be seen most clearly in Fig. 1, 4-way valve 17 comprises a generally spherical housing 17a having four flanged openings. A circular vane 17b is rotatably mounted within spherical housing 17a on a shaft 17c. Vane 17b is adapted to be rotated through 90° to and from the position shown in solid lines and dotted lines. When in the position shown in solid lines of Fig. 1, the incoming gas is directed into conduit 18; when in the position shown in dotted lines incoming gas flows into conduit 19.

Valve 17 may be operated by any suitable mechanism adapted to effect rotation of the vane 17b to and from its two positions to thereby effect periodic reversal of the direction of gas flow through the system. A suitable mechanism for accomplishing this, such as a solenoid, is contained in a housing 36 and controlled by a suitable timing mechanism having a control dial 37 for controlling its operation. Since a solenoid valve operator and a timer control for periodic actuation are well known conventional elements, further description of these is unnecessary.

Assuming that vane 17b is in the position shown in solid lines, gas introduced through inlet line 16 flows in the direction shown by the arrows, through valve 17 and line 18 into chamber 27, and thence through perforated plate 21, subsection $B_1$, perforated plate 25, subsection $A_1$, perforated plate 22, chamber 28, and thence into a fuel injection and mixing chamber 29. For the purpose of directing the flow of gases from bed section 14 into chamber 29, a horizontal baffle 30 extending across the housing, and a vertical baffle 31, are provided. It will be noted that baffle 31 directs the flow of gases into and out of the upper and lower extremities of chamber 29, this arrangement being employed to permit a relatively long path of travel of the gas stream after injection of the fuel to thus insure good mixing of the fuel with the gas stream. In the central portion of chamber 29, a fuel injection nozzle 32, supplied by fuel supply line 33 is provided. Through nozzle 32 a suitable fuel, preferably a gaseous or vaporizable liquid fuel, is injected into the gas stream as it passes through chamber 29.

Still assuming the same direction of gas flow, the gases flow from chamber 29 around baffle 31, into chamber 34, through perforated plate 23, sub-section $A_2$, perforated plate 26, sub-section $B_2$, perforated plate 24, chamber 35 and thence through line 19 and valve 17 to outlet line 20.

The flow is reversed by rotating vane 17b through 90° to the position shown in dotted lines in which case the incoming gas flows by line 19 into chamber 35 and thence through bed section 15, chambers 34, 29 and 28, bed section 14, chamber 27 and is then exhausted by line 18 through valve 17 and outlet line 20.

As stated above, sub-sections $A_1$ and $A_2$, which comprise the central portion of bed 13 with respect to the direction of gas flow, are comprised of an oxidation catalyst. In the embodiment shown, the catalyst in sub-sections $A_1$ and $A_2$ is in the form of relatively small pellets 38. Although the invention is not limited to any particular type or form of oxidation catalyst, catalysts which are particularly suitable include, for example, pellets of activated alumina, impregnated with various metals such as platinum, palladium, copper, nickel, silver, or combinations such as copper-chromium. Oxidation catalysts of high activity, for example, may be prepared by impregnating pellets of activated alumina with .2% by weight of metallic platinum by dipping the pellets in a solution of chloroplatinic acid, drying, and then heating to decompose the deposited platinum salt to produce a deposit of finely divided platinum on activated alumina. While the use of regularly or irregularly shaped pellets or particles of catalyst will very often be found to be advantageous and convenient, other shapes and catalytic configurations may be employed, as will be explained in more detail hereinafter.

In the embodiment shown in the drawings, the outer portions of bed 13 with respect to the direction of gas flow, namely, sub-sections $B_1$ and $B_2$ are composed of relatively small particles, such as particles ranging in size from $\frac{1}{16}''$ to $\frac{1}{2}''$, of a catalytically inert material preferably having a high heat capacity:volume ratio for reasons that will be explained more in detail below.

In the operation of the device, it is first necessary to heat the central portion of the bed 13 with respect to the direction of gas flow (viz. sub-sections $A_1$ and $A_2$ and if desired portions of sub-sections $B_1$ and $B_2$ adjacent thereto) to a temperature at which oxidation of the contaminants in the gas stream, as well as catalytic oxidation of the fuel injected into the gas stream in chamber 29, will take place. Starting with a cold apparatus, this may be accomplished for example by introducing hot gases at or above the required temperature into chamber 29 by line 40. With valve 16a on inlet line 16 closed, and with the vane 17b in the position shown in solid lines, hot gases introduced by line 40 will flow into chamber 29 and thence through bed section 15 and out through conduits 19 and 20. Heat exchange between the hot gases and the solid particles in bed section 15 will result in progressively heating this section of the bed starting with the portion immediately adjacent perforated plate 23. As the hot gas continues to flow in the same direction the heated zone of section 15 will be enlarged progressively toward its outer portions adjacent perforated plate 24. The precise bed temperature gradients established will depend upon heat exchange coefficients between the gas stream and the bed and other factors as will be discussed below. When the heated zone has progressed through sub-section $A_2$ and if desired a portion of sub-section $B_2$ adjacent thereto, but before it has reached the outer portions of sub-section $B_2$ adjacent perforated plate 24, the position of vane 17b is changed to that shown in dotted lines, causing gases from line 40 to flow through bed section 14 thus heating the central portion of bed section 14 to the desired temperature in the same manner.

With the central portions of bed 13 thus raised to the proper temperature (e.g. 1000° F.) the flow of gases from line 40 is cut off and the gas stream to be treated is then admitted by opening valve 16a. The gases to be treated may, for example, be the exhaust gases from a diesel engine or a drying process or chemical manufacturing operation at a relatively low temperature such as 300° F. to 400° F. and containing small concentrations, such as 100 to 1000 parts per million, of obnoxious constituents such as hydrocarbons, aldehydes, mercaptans or the like. The gas to be treated should contain sufficient oxygen to supply that necessary for catalytic oxidation of the contaminants it contains as well as the fuel introduced in chamber 29. If sufficient oxygen is not present in the original gas, this should be added. Assuming gas flow in the direction shown by the arrows, the gas flowing through section 14 becomes heated by heat exchange with the hot central portion thereof and on passing in contact with the hot catalyst in sub-section $A_1$, some or all of the oxidizable contaminants in the stream may be catalytically oxidized. The heated gas stream then flows into chamber 29 where fuel is injected into the stream through nozzle 32. If a liquid fuel is employed, the heated gas stream causes rapid vaporization of the fuel so that when the mixture reaches catalytic sub-section $A_2$, the fuel is in the vapor form. On contact with the hot catalyst in sub-section $A_2$, the fuel is catalytically oxidized thus raising the temperature of sub-section $A_2$, and at the same time, catalytic oxidation of the original contaminants in the gas stream is effected. On flowing through the unheated portion of sub-section $B_2$, the hot purified gas stream is cooled by heat exchange with this cool portion of the bed and leaves at a reduced temperature through line 19.

As the gas flow continues in the direction shown by the arrows, bed section 14 becomes progressively cooled by heat exchange with the relatively cool gas stream flowing through it. Simultaneously, bed section 15 is progressively heated as the heat picked up by the gas stream in bed section 14 is transferred to section 15 and as a result of the catalytic oxidation in sub-section $A_2$ of the injected fuel.

Thus, a "cooling wave" moves progressively through section 14 toward perforated plate 22, while a "heating wave" progressively moves through section 15 toward perforated plate 24. If gas flow were permitted to continue in the same direction, sub-section $A_1$ would become cooled to a temperature below that at which effective catalytic oxidation takes place and eventually would be cooled to the temperature of the incoming gas stream. At the same time, section 15 would become heated in its entirety so that the gas stream would leave at a high temperature, and undergo no cooling. However, before sub-section $A_1$ has been cooled below the temperature at which effective catalytic oxidation takes place, the gas flow is reversed by turning the vane 17b of valve 17 to the position shown in dotted lines whereupon the flow of heat between the two bed sections is also reversed, section 15 becoming progressively cooled and section 14 becoming progressively heated.

The bed temperature gradients that are established in the system described above depend upon a number of factors including the heat exchange coefficients between the gas stream and the bed of solids, the conductivity of the bed, radiation losses, and the length of the time between flow reversals. Before discussion of these factors and the effect they have upon the bed temperature gradients and upon the efficiency of the process, reference is first made to Figs. 5A to 5F which illustrate the operation of a theoretic system of the type described in which the heat exchange coefficients between the gas and the solids is infinite and where conductivity of the bed and radiation losses are infinitely small.

Fig. 5A shows diagrammatically the two bed sections 14 and 15 with their respective sub-sections $B_1$, $B_2$ and $A_1$, $A_2$. Figs. 5B to 5F show bed-temperature gradients at intervals during a complete cycle in which the gas flow undergoes a single reversal of direction with temperature plotted on the horizontal axis and distance through the bed in the direction of gas flow plotted on the vertical axis. The temperature of the entering gas stream is $T_1$. In Fig. 5B the central portion of the bed between limits $L_1$ and $L_3$ are assumed to have been heated to an elevated temperature $T_3$ while the outer portions of the bed are at the temperature of the entering gas stream $T_1$. As the gas flow continues downwardly as seen in these figures, thermal boundaries $L_1$ and $L_3$ also move downwardly. Referring to Fig. 5B, the entering gas stream at temperature $T_1$ encounters the hot portion of the bed at $L_1$. By virtue of the assumed infinite heat exchange coefficient between the gas and bed of solids and the assumed lack of heat losses or bed conductivity, the gas at $L_1$ will be instantaneously heated to the bed temperature $T_3$ at this point while a corresponding portion of the bed is instantaneously cooled to temperature $T_1$ of the gas stream. At the same time, the heated gas stream crossing limit $L_3$ will be instantaneously cooled down to its original temperature $T_1$ while a corresponding portion of the bed at this point will be instantaneously heated to temperature $T_3$.

With continued gas flow in the same direction, it may be seen that limits $L_1$ and $L_3$ will move downwardly at the same rate through the bed of solids in the same direction as the gas stream. This downward movement is shown in Figs. 5C and 5D. In Fig. 5D limit $L_1$ has now moved to $L_2$ while $L_3$ has moved to $L_4$. As may be seen in Fig. 5A, limits $L_2$ and $L_3$ correspond to the boundaries between the catalytic portions and the inert portions of the bed.

If the flow of gas were continued in the same direction as indicated in Fig. 5D, limit $L_2$ would move through the catalytic sub-section $A_1$ while limit $L_4$ would move to the outermost portion of sub-section $B_2$. When the thermal boundaries have reached the positions shown in Fig. 5D however, the flow of gas is reversed and the same process is repeated in the reverse direction. That is, boundaries $L_4$ and $L_2$ move upwardly in the direction of gas flow as shown in Fig. 5E until they return to their original limits $L_1$ and $L_3$ as shown in Fig. 5F, at which time the flow of gas is again reversed to repeat the cycle.

In the theoretical system illustrated in Figs. 5A to 5F, it is unnecessary to add any further heat to the system once the central portion of the bed has been heated to the required temperature since no heat losses occur. Thus, theoretically, a gas stream at a temperature $T_1$ could be heated to an elevated temperature $T_3$ and cooled back down again without the expenditure of any heat energy. Since, however, infinite heat transfer coefficients are not attained in practice there is a need for a finite "driving force" or temperature differential between the bed and the gas if the desired heat exchange is to take place. As a result, the temperature of the gas leaving the bed must necessarily be somewhat higher than its entering temperature. Furthermore, heat losses across the thermal boundaries by radiation and by conduction through the bed do actually occur with the result that the perfectly sharp thermal boundaries as illustrated in Figs. 5B to 5F do not exist in practice.

Thus, in a practical system the gas stream to be treated, instead of entering and leaving at the same temperature, enters at a temperature $T_1$ and leaves at a somewhat higher temperature between its entering temperature and the highest temperature $T_3$ attained in the bed. This heat loss from the system plus heat losses occurring from the apparatus by radiation and conduction to the surroundings necessitates the introduction of additional heat to maintain the desired elevated temperature $T_3$ in the central portion. In accordance with the present invention, where the bed is employed both as a heat exchanger and as a heat generator, this additional heat is supplied by the introduction of fuel into the gas stream which is catalytically oxidized in the central catalytic portion of the bed.

Reference is now made to Figs. 6A to 6F of the drawings showing bed temperature gradients in a somewhat idealized fashion as attained in a practical system employing a bed of relatively small pellets. Fig. 6A shows the bed of solids diagrammatically with sections 14 and 15, catalytic sub-sections $A_1$ and $A_2$, and inert sub-sections $B_1$ and $B_2$ corresponding to those shown in Figs. 2 and 3 of the drawings. Figs. 6B to 6F show bed temperature gradients during a complete cycle involving one reversal of gas flow.

Fig. 6B shows the bed temperature gradients immediately after the direction of gas flow has been reversed from upward to downward flow. The gas stream, entering at temperature $T_1$ encounters the outermost portion of sub-section $B_1$ which has been raised to a temperature $T_2$ intermediate the entering temperature and the maximum temperature attained in the bed $T_3$. Sub-section $A_1$ at this moment is at the maximum temperature $T_3$ at which it has been maintained by the catalytic oxidation of the injected fuel during the preceding portion of the cycle. Catalytic sub-section $A_2$ has been cooled to a temperature $T_4$ somewhat below the maximum temperature $T_3$. Temperature $T_4$ should not fall below the activation temperature of the catalyst so that the injected fuel entering sub-section $A_2$ immediately after flow reversal as shown in Fig. 6B will be catalytically oxidized. If temperature $T_4$ falls below the activation temperature of the catalyst, upon flow reversal the injected fuel will not be catalytically oxidized, and instead of increasing in temperature, sub-section $A_2$ will undergo a further temperature decrease. As shown in Fig. 6B, the outermost portion of sub-section $B_2$ is at a temperature approaching the gas inlet temperature $T_1$.

As the gas flow continues in a downward direction, sub-section $B_1$ becomes gradually cooled such that the temperature of the outermost portion of the bed tends to approach the entering gas temperature $T_1$, as indicated in Figure 6C. At the same time, sub-section $A_1$ undergoes cooling since it is no longer being supplied with fuel, while sub-section $A_2$ has rapidly attained its maximum temperature $T_3$ as a result of the catalytic oxidation of the injected fuel; at the same time the temperature of the outermost portion of sub-section $B_2$ tends to approach a higher temperature $T_2$ between $T_1$ and $T_3$, all as shown in Fig. 6C.

In Fig. 6D the bed temperature gradients are shown just prior to reversal of gas flow from a downward to upward direction. At this time, the temperature of the outermost portion of sub-section $B_1$ is approaching the inlet gas temperature $T_1$; sub-section $A_1$ has been cooled to temperature $T_4$; sub-section $A_2$ is being maintained at its maximum temperature $T_3$ by virtue of the catalytic oxidation of the injected fuel; while the outermost portion of sub-section $B_2$ has increased to a temperature $T_2$.

In Fig. 6E, the flow has been reversed. The outermost portion of sub-section $B_2$ is becoming cooled and approaching gas inlet temperature $T_1$; sub-section $A_2$ is also becoming cooled and approaching temperature $T_4$; sub-section $A_1$ has become heated by catalytic oxidation of the injected fuel to its maximum temperature $T_3$; while the temperature of the outermost portion of sub-section $B_1$ is increasing and approaching $T_2$.

Fig. 6F shows the bed temperature gradients just prior to the reversal of gas flow from an upward to a downward direction and is identical with the bed temperature gradients shown in Fig. 6B. As may be seen, the outermost portion of sub-section $B_2$ has approached the gas inlet temperature $T_1$; sub-section $A_2$ has been cooled to a temperature $T_4$; sub-section $A_1$ is maintained at its maximum temperature $T_3$ by catalytic oxidation of the injected fuel; and the outermost portion of sub-section $B_1$ has increased to temperature $T_2$.

As may be seen from Figs. 6B to 6F, with a constant gas inlet temperature $T_1$, the temperature of the outermost portions of sub-sections $B_1$ and $B_2$, and accordingly, the exit temperature of the gas stream, varies between $T_1$ and $T_2$. Similarly, the temperature of catalytic sections $A_1$ and $A_2$ varies between $T_3$ and $T_4$. The frequency of flow reversals are controlled such that the temperature of catalytic sections $A_1$ and $A_2$ is never permitted to fall below the activation temperature of the catalyst so that upon flow reversal, the catalyst bed will be immediately ready to catalytically oxidize the injected fuel and thus regain its maximum temperature $T_3$.

The thermal efficiency of the process depends in large measure upon how closely $T_1$, the entering gas temperature approaches $T_2$, the exit gas temperature from the system. This in turn depends chiefly upon the heat exchange coefficients between the gas stream and the bed, the size of the bed and the cycle length (i.e., the interval between reversals of the direction of gas flow. Increasing heat exchange coefficients and increasing bed size increases termal efficiency, while increasing cycle length generally results in a decrease.

The gas-bed heat exchange coefficients depend largely upon the structure of the bed. A bed of relatively small particles as illustrated in the drawings, produces high heat exchange coefficients and accordingly good thermal efficiency. Generally speaking, the larger the particle size the poorer the coefficients. Where the construction of the gas permeable bed is relatively open, leaving relatively large passages for the flow of the gas stream, as in a bed of relatively large particles (e.g. 4" particle) or checker brickwork assembly or the like, the coefficients decrease and bed-temperature gradients tend to become less sharp, but at the same time the pressure drop through such a system is generally less than with a bed of relatively small particles. Generally speaking, a bed structure which provides good coefficients and sharp temperature gradients will at the same time produce relatively high pressure drops. In practice, the choice of a particular type of bed structure will generally be governed by a balance between these two factors. Where relatively high pressure drops are not objectionable, a bed of relatively small pellets ranging in size from $\frac{1}{16}''$ to $1''$ would be preferred; where relatively low pressure drops are a necessity, a more open structure such as a checker brickwork assembly may be chosen although the thermal efficiency of such a system will generally be lower, requiring the expenditure of greater amounts of heat energy to maintain the central portion of the bed at the proper temperature.

If desired, the entire bed may be constructed of catalytically active material, in which case proper attention should be given to the heat exchange properties of the outer portions of the bed since these serve chiefly as heat exchangers. According to the preferred embodiment of the invention, however, only the central portion of the bed is constructed of catalytically active material. This arrangement has a number of important advantages. It is usually less expensive since the catalyst will ordinarily be many times more costly than the materials which merely perform a heat exchange function. Secondly, this permits independent choice of the materials and type of bed construction for the outer inert portions and the central catalytic portions. Catalysts are often constructed of relatively porous materials such for example as from activated alumina having a relatively low density, while it is often desirable to choose a relatively high density material for the portions of the bed performing primarily heat exchange functions. Similarly, it will often be found desirable to use a different type of bed construction for the heat exchange portions than for the catalytic portions such, for example, as the combination of a bed of catalytic pellets in the central portion with a relatively open checker brickwork structure for the outer heat exchange portions of the bed, or conversely the combination of a relatively open structure for the inner catalytic portions (e.g. catalytic units as described in U.S. Patent No. 2,730,434) and relatively small particles for the outer heat exchange portions.

Within practical limits, the thermal efficiency of a given system can be controlled to an extent by varying the length of the cycles, that is the intervals between reversals of gas flow direction. In general, the shorter the cycle for a given system the higher the thermal efficiency, that is the closer the approach between the entering and exit gas temperature. Practical considerations will place a limit on the frequency at which the reversals of flow may be made. Typical cycle lengths for commercial installations may for example range from 15 seconds to 1 minute.

Use of a material for the outer heat exchange portions having a high heat capacity:volume ratio is advantageous since such material will provide higher thermal efficiencies for a heat exchange bed of given size and using a given cycle length. Dense refractory materials, such as fused silica or fused alumina are particularly advantageous because of their relatively high heat capacity:volume ratio and also because they have a relatively low heat conductivity which minimizes heat conduction between the particles in the bed.

A particularly advantageous application for the system of the invention is in the purification of the exhaust fumes from diesel engines. Such fumes are exhausted at temperatures ordinarily averaging from 300° F. to 650° F. and contain small concentrations e.g. 100 parts per million of irritating aldehydes, organic acids and other oxygenated organic compounds, hydrocarbons both saturated and unsaturated, as well as relatively small concentrations e.g. .01% to .5% of carbon monoxide. In addition, many diesel engines, particularly when in poor adjustment or in a worn condition, produce objectionable amounts of particulate carbon in the form of a sooty smoke. To purify such an exhaust catalytically, it has been found necessary to heat the exhaust stream to a temperature of approximately 1000° F. to 1200° F. or in other words from 400° F. to 600° F. higher than the exhaust temperature. The heat the exhaust stream to this temperature by ordinary means and without the use of a heat exchanger may consume as much fuel as required to operate the engine. The use of ordinary heat exchange systems has been found impractical because of their size, relative inefficiency and expense. Using the system of the invention, the exhaust of such engines may be purified with the expenditure of a minimum amount of additional fuel to produce a completely purified exhaust stream. In a typical application of the system to a diesel exhaust stream, a system similar to that illustrated in the drawings was connected to the exhaust stream of a 4-cycle diesel engine having a 153 cu. in. piston displacement and an average exhaust temperature at the manifold of approximately 350° F. Sufficient diesel oil was injected into the stream and vaporized and then catalytically oxidized on the central catalytic portion of the bed as illustrated in the drawings and previously described to maintain the central catalytic portion of the bed at a temperature of approximately 1050° F. The catalyst employed was in the form of pellets of activated alumina impregnated with approximately 5% of copper and chromium oxides and approximately .1″ in size. The outer heat exchange portions of the bed were composed of particles of about the same size composed of corhart (a dense fused alumina). Exhaust stream analysis before and after the purifier showed the elimination of over 80% of the objectionable aldehydes and other oxidizable constituents. Fuel expenditure to elevate the gas stream to the temperature required for purification amounted to approximately 25% of that required without the use of a heat exchanger.

The amount of fuel required to maintain the desired elevated temperature in the central portion of the bed for a given size installation depends upon the thermal efficiency of the system. The largest heat loss from the system will normally result from heat carried out in the treated gas stream, which as explained previously, will leave at an average temperature somewhat higher than the entering gas temperaure. The rate of fuel injection must be such that the heat generated by the catalytic oxidation of the fuel in the catalytic portion of the bed is sufficient to supply heat at the rate it is carried out in the gas stream, as well as to compensate for heat loss due to radiation and conduction to the surroundings from the apparatus itself. For any particular installation, the proper rate of fuel supply can be best determined by simple experiment.

Reference is now made to Figs. 4A and 4B which show alternative arrangements of the device illustrated in Figs. 1 to 3. For the sake of simplicity the same reference numerals have been applied to equivalent elements. Referring particularly to Fig. 4A, it may be seen by the gas permeable bed of solids, indicated as embraced by the large bracket 13, is divided into two sections by smaller brackets 14 and 15, these two sections being arranged in side by side relation in two adjacent chambers 100 and 101 separated by a partition 102. Bed sections 14 and 15 are in turn divided into catalytic sub-sections $A_1$ and $A_2$ and subsections $B_1$ and $B_2$ comprised of inert particles which perform chiefly heat exchange functions.

Flow of the gas stream to be treated through the bed is controlled by a 4-way valve 17 similar to the valve shown in Figs. 1 to 3. Gas entering by line 16 flows by way of line 18 through section 15, fuel injection chamber 29, section 14, and is exhausted through line 19 and outlet 20. Upon reversal of the valve the flow takes place in the opposite direction.

As may be seen in Fig. 4A, catalytic sub-sections $A_1$ and $A_2$ occupy the central portion of the bed 13 with respect to the direction of gas flow while sub-sections $B_1$ and $B_2$ comprise the outer portion of the bed. Injection of fuel in chamber 29 serves to maintain the central catalytic portions at the desired elevated temperature.

Referring now to Fig. 4B the gas permeable bed is indicated by the bracket 13. The bed is divided into two sections 14 and 15, arranged within a housing 10. Sections 14 and 15 are in turn divided into catalytic sub-sections $A_1$, $A_2$, and into sub-sections $B_1$ and $B_2$, comprised of catalytically inert solids. A baffle 103 separates sections 14 and 15.

Flow through the system is controlled by 4-way valve 17. With the gas flow in the direction shown by the arrows, the gas stream enters by line 16 and is directed through line 18, through section 15, fuel injection chamber 29, section 14, and is exhausted through line 19 and outlet line 20. Here again, catalytic sub-sections $A_1$ and $A_2$ comprise the central portion of the bed with respect to the direction of gas flow, while sub-sections $B_1$ and $B_2$ comprise the outer portion of the bed.

It is to be understood that other variations of the invention than those illustrated and described are intended to be included within the scope of the appended claims.

I claim:

1. A method for the catalytic treatment of a relatively low temperature gas stream containing small amounts of combustible material comprising the steps of flowing said gas stream through a gas-permeable bed of solids adapted to exchange heat with said gas stream, said bed being divided into two substantially equal sections, at least the central portion of each section with respect to the direction of gas flow being comprised of an oxidation catalyst, flowing said gas stream as it passes from one section into the other through a fuel injection zone, injecting fuel into said stream in said zone and catalytically oxidizing said fuel as the fuel-laden stream traverses the oxidation catalyst in the central portion of the section downstream from said fuel injection zone, thereby maintaining said portion at a temperature sufficiently high to promote the catalytic oxidation of combustible material in said stream, periodically reversing the direction of gas flow through said bed whereby the catalytic central portion of each of said sections is alternately heated by the catalytic oxidation therein of the injected fuel, and controlling the frequency of said periodic flow reversals such that the hot zone of said bed is maintained at a relatively low temperature whereby the treated gas stream leaves said bed at a temperature approximately that of said relatively cool outer portions.

2. A method in accordance with claim 1 in which the central portions of each of said sections with respect to the direction of gas flow are comprised of oxidation catalyst, while the outer portions of each of said sections are comprised of catalytically inert material.

3. A method for the catalytic treatment of a gas stream exhausted from a diesel engine comprising the steps of flowing said gas stream through a gas-permeable bed of solids adapted to exchange heat with said gas stream, at least a portion of said bed being comprised of an oxidation catalyst, said catalytic portion being adjacent a fuel injection zone, the flow through the bed being in a direction to provide for the exhaust of the stream from the catalyst portion of the bed, flowing the stream exhausted from said bed through said fuel injection zone, injecting fuel into said stream in said zone and flowing the fuel-laden stream into a second gas-permeable bed of solids adapted to exchange heat with said gas stream with at least a portion of said second bed being comprised of an oxidation catalyst, the fuel carrying stream being introduced first into the catalyst portion of said second bed to catalytically oxidize the fuel, periodically reversing the direction of gas flow through said beds whereby catalytic portions of said beds are alternately heated by the catalytic oxidation therein of the injected fuel to maintain said catalytic portions at a temperature in a range sufficiently high to promote the catalytic oxidation of combustible material in said stream and controlling the frequency of said periodic flow reversals such that said catalytic portions of said beds are maintained at relatively low temperatures within said range.

4. A method for the catalytic treatment of a gas stream exhausted from a diesel engine comprising the steps of flowing said gas stream through a gas-permeable bed of solids adapted to exchange heat with said gas stream, at least a portion of said bed being comprised of an oxidation catalyst, said catalytic portion being adjacent a fuel injection zone, the flow through the bed being in a direction to provide for the exhaust of the stream from the catalyst portion of the bed, flowing the stream exhausted from said bed through said fuel injection zone, injecting fuel into said stream in said zone and flowing the fuel-laden stream into a second gas-permeable bed of solids adapted to exchange heat with said gas stream with at least a portion of said second bed being comprised of an oxidation catalyst, the fuel carrying stream being introduced first into the catalyst portion of said second bed to catalytically oxidize the fuel, periodically reversing the direction of gas flow through said beds whereby catalytic portions of said beds are alternately heated by the catalytic oxidation therein of the injected fuel to maintain said catalytic portions at a temperature sufficiently high to promote the catalytic oxidation of combustible material in said stream and controlling the frequency of said periodic flow reversals such that the portions of said beds which are relatively remote from said fuel injection zone are maintained at relatively low temperatures.

References Cited in the file of this patent

UNITED STATES PATENTS

| | | |
|---|---|---|
| 2,121,733 | Cottrell | June 21, 1938 |
| 2,421,744 | Daniels et al. | June 10, 1947 |
| 2,731,335 | Odell | Jan. 17, 1956 |